United States Patent
He et al.

(10) Patent No.: US 11,958,788 B2
(45) Date of Patent: Apr. 16, 2024

(54) METHOD OF PREPARING ALKALI ACTIVATION MATERIAL BY USING RED MUD-BASED WET GRINDING AND CARBON SEQUESTRATION AND APPLICATION THEREOF

(71) Applicant: Hubei University Of Technology, Hubei (CN)

(72) Inventors: Xingyang He, Hubei (CN); Weilong Li, Hubei (CN); Ying Su, Hubei (CN); Zhengqi Zheng, Hubei (CN); Jin Yang, Hubei (CN); Yingbin Wang, Hubei (CN); Hongbo Tan, Hubei (CN); Chenghao Li, Hubei (CN)

(73) Assignee: Hubei University Of Technology, Hubei (CN)

( * ) Notice: Subject to any disclaimer, the term of this patent is extended or adjusted under 35 U.S.C. 154(b) by 0 days.

(21) Appl. No.: 18/322,561

(22) Filed: May 23, 2023

(65) Prior Publication Data

US 2023/0382791 A1    Nov. 30, 2023

(30) Foreign Application Priority Data

May 30, 2022   (CN) .......................... 202210599834.3

(51) Int. Cl.
  *C04B 7/153*  (2006.01)
  *C04B 7/24*   (2006.01)
  *C04B 7/36*   (2006.01)
  C04B 103/30  (2006.01)
  C04B 111/00  (2006.01)

(52) U.S. Cl.
  CPC ...... *C04B 7/1535* (2013.01); *C04B 2103/302* (2013.01); *C04B 2111/00017* (2013.01)

(58) Field of Classification Search
  CPC ............ C04B 7/1535; C04B 2103/302; C04B 2111/00017
  See application file for complete search history.

(56) References Cited

U.S. PATENT DOCUMENTS

| | | | |
|---|---|---|---|
| 2009/0169452 A1* | 7/2009 | Constantz .......... | B01D 53/1493 423/220 |
| 2010/0083880 A1* | 4/2010 | Constantz ................ | C04B 7/02 106/801 |
| 2013/0167756 A1* | 7/2013 | Chen ......................... | C04B 7/34 106/789 |
| 2018/0346380 A1 | 12/2018 | Nie et al. | |

FOREIGN PATENT DOCUMENTS

| | | | | |
|---|---|---|---|---|
| CN | 106866052 | A | * | 6/2017 |
| CN | 107352928 | | | 11/2017 |
| CN | 110002808 | | | 7/2019 |
| CN | 110028256 | | | 7/2019 |
| CN | 110204258 | | | 9/2019 |
| CN | 110655342 | A | * | 1/2020 |
| CN | 111875332 | | | 11/2020 |
| CN | 111960451 | A | * | 11/2020 |
| CN | 112624538 | A | * | 4/2021 ............. C02F 11/00 |
| CN | 112694292 | | | 4/2021 |
| CN | 112723843 | | | 4/2021 |
| CN | 113929390 | A | * | 1/2022 |
| CN | 114349406 | | | 4/2022 |
| CN | 114349406 | A | * | 4/2022 |
| CN | 115212713 | A | * | 10/2022 |
| CN | 115215564 | A | * | 10/2022 |
| CN | 115215624 | A | * | 10/2022 |
| CN | 115521083 | A | * | 12/2022 |
| CN | 115679096 | A | * | 2/2023 |

OTHER PUBLICATIONS

Machine translation of Zheng et al. CN115028381A, publication date Sep. 9, 2022.*
Yadav et al., Sequestration of carbon dioxide (CO2) using red mud, Journal of Hazardous Materials 176 (2010) 1044-1050.*
Quan et al., The Use of Slag and Red Mud for the Synthesis of a Slag-Based Cementitious Material, 2022 J. Phys.: Conf. Ser. 2329 012036.*
Alam et al. Strength and durability characteristic of alkali activated GGBS stabilized red mud as geo-material, Construction and Building Materials 211 (2019) 932-942.*
Shen Jian-Li et al., "Experimental Study of Material of Red Mud Base Activated by Alkali", Journal of Binzhou University, vol. 28, Issue 3, Jun. 2012, with English translation thereof, pp. 1-4.

* cited by examiner

*Primary Examiner* — Jun Li
(74) *Attorney, Agent, or Firm* — JCIP GLOBAL INC.

(57) ABSTRACT

The present invention discloses a method of preparing an alkali activation material by using red mud-based wet grinding and carbon sequestration and an application thereof. The preparation method includes: (1) adding water, red mud, a crystalline control agent, and a grinding aid into a wet grinding carbon sequestration apparatus to perform wet grinding, and simultaneously introducing $CO_2$ until a slurry pH reaches 7 to 7.5; and removing wet grinding balls by a sieve to obtain a slurry A; (2) adding carbide slag, water and a water reducer to a wet planetary ball grinder tank for wet grinding, and removing wet grinding balls by a sieve to obtain a slurry B; (3) taking 50 to 80 parts of the slurry A and 20 to 50 parts of the slurry B and mixing them to obtain an alkali activation material.

8 Claims, No Drawings

METHOD OF PREPARING ALKALI ACTIVATION MATERIAL BY USING RED MUD-BASED WET GRINDING AND CARBON SEQUESTRATION AND APPLICATION THEREOF

CROSS-REFERENCE TO RELATED APPLICATION

The present application is based on and claims the priority benefits of China application No. 202210599834.3, filed on May 30, 2022. The entirety of the above-mentioned patent application is hereby incorporated by reference herein and made a part of this specification.

BACKGROUND

Technical Field

The present invention relates to the field of preparation technologies of alkali activation materials and in particular to a method of preparing an alkali activation material by using red mud-based wet grinding and carbon sequestration and an application thereof.

Description of Related Art

Red mud is an industrial waste residue produced during alumina smelting in the metallurgy industry. Since the red mud contains an amount of ferric oxide, it is presented as red and hence named as red mud. The red mud has the characteristics of high alkalinity, complex chemical composition, low permeability, high dispersity and etc. The raw powder of the red mud has a small particle size and its chemical composition includes $CaO$, $Fe_2O_3$, $SiO_2$, $MgO$, $Al_2O_3$, $Na_2O$, $K_2O$ and the like. Because the demand for the nonferrous metal aluminum increases continuously, the alumina industry always tends to be in quick expansion, which leads to a gradual increase of the production of the red mud. But, there is only 4% utilization rate, and thus the comprehensive utilization is low. Most of the red mud is still stockpiled in the open air and such simple open-air stockpiling may easily bring impact on the alkalinity or acidity of the surrounding land, and pollution to the air environment and the underground water through approaches such as land erosion, flying dusts and rainwater seepage and the like. If the stored red mud is not treated or utilized reasonably, it will impose severe harm to the surrounding environment as well as being as a waste of resources.

Carbide slag is an industrial solid waste produced after production of polyvinyl chloride (PVC). Currently, there are about tens of millions of tons of solid wastes being discharged. Since the transportation cost is high and the carbide slag itself contains many types of impurities, its comprehensive utilization rate is low. It is usually treated by land filling or stockpiling, which may easily cause pollution to the ground surface and the underground water as well as severe destruction to the ecological environment. The carbide slag contains rich calcium resource and has the characteristics of good particle dispersity, large specific surface area, large pore structure, quick dissolution rate and low thermal decomposition temperature and the like. Therefore, it can be used as an excellent secondary calcium-based resource for application.

Along with development of scientific technologies and industrial progress, the global $CO_2$ emission increases year on year. Due to the greenhouse effect generated by the $CO_2$ emission, the global average temperature increases by 2° C., causing melting of the glaciers, rise of the sea level, increase of the extreme weathers and destruction of the natural ecology system and the like. Therefore, it is required to find a method of utilizing $CO_2$ as green environment-friendly resource, so as to address the above current technical problems.

Relevant study has been conducted on red mud as an alkali activator. The Chinese patent with the application number 202110089327.0 discloses a low-shrinkage and high-strength red mud-slag geopolymer, where the utilization amount of red mud is small and additional energy consumption is caused by doping a chemical reagent for system activation, leading to increased cost and low actual utilization rate. The Chinese patent with the application number 201910334389.6 discloses a preparation of a geopolymer grouting material based on red mud, which, however, requires a complex process flow covering high temperature activation, high temperature calcination and oven drying as well as large energy consumption. The Chinese patent with the application number 201710587993.0 discloses a red mud-fly ash high-strength heat-insulation building block based on alkali activation, which requires complex molding and curing conditions in later stage, where the molding requires a pressure of 40 MPa, leading to failure of large-scale utilization for it.

Till now, no report is made on compound activation on the slag powder in combination with carbide slag and red mud after carbon sequestration. Since the red mud has a high alkalinity of about pH 11 to 13, and contains elements such as Ca, Mg and Na and etc, it has a potential for carbon sequestration and can react with $CO_2$ to generate a stable carbonate product. In this case, on one hand, the alkalinity of the red mud can be reduced, and on the other hand, sequestration can be performed on the industrial exhaust gas $CO_2$. The following problems are currently to be solved for those skilled in the art: how to reduce the alkalinity of red mud by using the industrial exhaust gas $CO_2$ while performing $CO_2$ sequestration, and further, how to perform compound alkali activation on slag powder in cooperation with wet-ground carbide slag and the red mud, so as to achieve the purpose of controlling waste by using waste in an environment-friendly way.

SUMMARY

The object of the present invention is to provide a method of preparing an alkali activation material by using red mud-based wet grinding and carbon sequestration and an application thereof. The present invention can realize permanent $CO_2$ sequestration and at the same time increase the utilization rate of carbide slag and red mud, avoiding the environmental impact caused by solid waste stockpiling. Further, the prepared alkali activation material can significantly activate the strength of the slag powder.

The present disclosure provides a method of preparing an alkali activation material by using red mud-based wet grinding and carbon sequestration. The method includes:

(1) performing wet grinding on water, red mud, a crystalline control agent, and a grinding aid with a mass ratio of 100:(20 to 50):(1 to 3):(1 to 5), introducing $CO_2$ at a flow rate of 0.1 to 0.25 L/min, and keeping a pressure of 0.2 to 0.5 MPa until a slurry pH reaches 7 to 7.5; removing wet grinding balls with a sieve to obtain a slurry A, where the slurry A has a particle size of 3 μm to 4.5 μm;

(2) adding carbide slag, water, and a water reducer with a mass ratio of 100:(30 to 60):(1 to 5) into a wet planetary ball grinder tank for wet grinding of 30 to 60 min; removing the wet grinding balls with a sieve to obtain a slurry B, where the slurry B has a particle size of 5.2 μm to 7.9 μm;

(3) taking 50 to 80 parts by mass of the slurry A and 20 to 50 parts by mass of the slurry B and mixing the two slurries to obtain an alkali activation material.

In some specific examples, the red mud is a red mud produced after alumina is produced by Bayer process, and the major ingredients of the red mud include calcite, quartz, sodalite, zultanite, calcium silicate, calcium silicoaluminate, and ferric oxide, with a pH of 11 to 13; radioactive internal and external exposure index is within 1.0 mSv/y, and a median particle size is 5 μm to 10 μm.

In some specific examples, the crystalline control agent is one or more combinations of sodium hexametaphosphate, sodium sulfate and sodium polycarboxylate.

In some specific examples, the grinding aid is one or more combinations of triethanolamine, O-cyclodextrin, and ethylenediamine tetraacetic acid.

In some specific examples, the water reducer is one or more combinations of a naphthalene series high-efficiency water reducer, a phenolsulfonate series high-efficiency water reducer, and a polycarboxylate series high-efficiency water reducer.

In some specific examples, the $CO_2$ introduced in step (1) is captured and purified from an industrial production exhaust gas, with a purity greater than 90%.

In some specific examples, wet grinding parameters in step (1) are: selecting zirconia balls with ball diameters of 1.5 to 2.0 mm and with ball diameters of 2.5 to 3.0 mm and mixing them at a ratio of 1:1; a ratio of the balls to red mud to be ground of 1:3 to 3:1; and a rotation speed of 400 to 800 r/min.

In some specific examples, the major ingredients of the carbide slag include $SiO_2$, $Al_2O_3$, $Fe_2O_3$, CaO, MgO, $Na_2O$ and $K_2O$, with a pH value of 12 to 13; and a median particle size is 20 μm to 30 μm.

In some specific examples, wet grinding parameters in step (2) are: selecting zirconia balls with ball diameters of 0.7 to 1.0 mm and 1.2 to 1.5 mm and mixing the balls at a mass ratio of 2:1, a ratio of the balls to red mud to be ground of (1 to 4): 1 and a rotation speed of 200 to 600 r/min.

The application of the above prepared alkali activation material is as follows:

The prepared alkali activation material, 100 parts of slag powder, and 10 to 25 parts of water are mixed to obtain a slurry C with a pH value of 11 to 13; and the slurry C is molded and cured.

In some specific examples, the slag powder is a ground granulated blast-furnace slag and its major ingredients include CaO, $SiO_2$, $Al_2O_3$ and the like, where a content of CaO is <50%, a content of $SiO_2$ is <30%, a content of $Al_2O_3$ is <15%, and a specific surface area is 400 $m^2$/kg to 500 $m^2$/kg.

The red mud after the wet grinding and carbon sequestration of the present invention has the advantages of low alkalinity and good stability and the like. The wet-ground carbide slag has the advantages of high specific surface area, high activity and high ion dissolution and the like. The slag powder subjected to compound activation by the red mud and the carbide slag has high strength and good stability.

In the present invention, $CO_2$ is introduced during wet grinding, and then the red mud particles are fully dispersed by using mechanical force and grinding balls to be in full contact with water molecules, such that better facilitating the dissolution of ions in the particles. The dissolved ions are dispersed in the liquid phase environment and react with $CO_2$ after fully contacting with $CO_2$ to generate stable carbonate. The wet-ground carbide slag may have a smaller particle size, and a higher activity. By doping the wet-ground carbide slag into the red mud slurry, on one hand, excessively dissolved carbonic acid during red mud wet grinding and carbon sequestration can be neutralized, and on the other hand, the pH can be adjusted to increase the alkalinity while $Ca(OH)_2$ in the carbide slag and soluble $Na_2CO_3$ generated during red mud carbon sequestration can be enabled to perform compound activation on the slag powder. Finally, the compound slurry is doped into the slag powder, and the slag powder can have good strength in both early and later stages. The present invention can activate the strength of the slag powder and achieve $CO_2$ permanent sequestration and also increase the utilization rate of the carbide slag and the red mud, realizing the purpose of controlling waste by using waste in an environment-friendly way.

The present invention has the following advantages as compared with the prior arts.

(1) During the wet grinding stage, the red mud particles can be fully crushed to increase a contact area between the red mud particles with water as well as the ion dissolution. By using the liquid phase environment, the dissolved metal ions are reacted with $CO_2$ to generate stable carbonate.

(2) During the carbon sequestration stage, by using the carbon sequestration potentials of high alkalinity, high Ca content and high Mg content and the like of the red mud, sequestration is performed on the industrial exhaust gas $CO_2$, which, on one hand, consumes industrial exhaust gas $CO_2$ and on the other hand, reduces the alkalinity of the red mud, which is helpful to later application.

(3) After mixing the wet-ground red mud with carbon sequestration and the wet-ground carbide slag, compound activation can be performed on the slag powder. The slag powder has high strength in both early and later stages, helping subsequent engineering applications. Thus, a new use method is provided for the two bulk solid wastes, red mud and carbide slag.

DESCRIPTION OF EMBODIMENTS

In order to better understand the present invention, the present invention will be further described in combination with specific examples. But the contents of the present invention are not limited to the following examples.

In the following examples and comparative examples, the red mud used herein comes from the solid wastes discharged from Henan Hengyuan Aluminum Industry Co., Ltd. and its median particle size is D50=5 μm; the carbide slag used herein comes from the solid wastes discharged from Hubei Yihua Group, and the $Ca(OH)_2$ content is >80%; the slag powder used herein comes from Wuhan Hengguan New Materials Technology Co., Ltd. and its basicity coefficient is 0.959.

Example 1

The specific steps of the present example are described below.

(1) Water, red mud, sodium hexametaphosphate, and β-cyclodextrin with a mass ratio of 100:20:1:3 were added to a wet grinding carbon sequestration apparatus to perform wet grinding, and simultaneously $CO_2$ was introduced at a flow rate of 0.1 L/min and a pressure in the wet grinding carbon sequestration apparatus was kept at 0.2 MPa, until a pH of a slurry reached 7.2. By using a 50-mesh square hole sieve, the wet grinding balls were removed to obtain a slurry A, and the solid particles in the slurry A had a particle size of 3.7 μm.

In this step, the wet grinding balls were obtained by mixing zirconia balls of ball diameters of 1.5 mm to 2.0 mm and ball diameters of 2.5 mm to 3.0 mm at a mass ratio of 1:1. A ratio of the balls to red mud to be ground was 2:1 and a rotation speed of wet grinding was 500 r/min.

(2) Carbide slag, water and a naphthalene series high-efficiency water reducer with a mass ratio of 100:30:2 were added to a wet planetary ball grinder tank for 30 min of wet grinding. By using a 100-mesh square hole sieve, the wet grinding balls were removed to obtain a slurry B, and the solid particles in the slurry B had a particle size of 6.8 μm.

In this step, the wet grinding balls were obtained by mixing zirconia balls of ball diameters of 0.7 mm to 1.0 mm and ball diameters of 1.2 mm to 1.5 mm at a mass ratio of 2:1. A ratio of the balls to red mud to be ground was 2:1 and a rotation speed of wet grinding was 300 r/min.

(3) 50 parts of the slurry A, 20 parts of the slurry B, 100 parts of slag powder and 10 parts of water were taken and mixed to obtain a slurry C, where a pH value of the slurry C was 11.3.

(4) The slurry C was taken, molded and then cured for 7 d and 28 d to obtain test blocks.

The preparation method of the present invention has simple steps, and the obtained test blocks have good volume stability without cracking and powdering. The strength of the obtained test blocks is evaluated based on GB/T 17671-1999 Method of testing cements—Determination of strength (ISO method) to show the compressive strength of 7 d is 23.8 MPa and the compressive strength of 28 d is 40.3 MPa.

Example 2

The specific steps of the present example are described below.

(1) Water, red mud, sodium sulfate, and ethylenediamine tetraacetic acid with a mass ratio of 100:40:3:5 were added to a wet grinding carbon sequestration apparatus to perform wet grinding, and simultaneously $CO_2$ was introduced at a flow rate of 0.2 L/min and a pressure in the wet grinding carbon sequestration apparatus was kept at 0.4 MPa, until a pH of a slurry reached 7.1. By using a 50-mesh square hole sieve, the wet grinding balls were removed to obtain a slurry A, and the solid particles in the slurry A had a particle size of 3.2 μm.

In this step, the wet grinding balls were obtained by mixing zirconia balls of ball diameters of 1.5 mm to 2.0 mm and ball diameters of 2.5 mm to 3.0 mm at a mass ratio of 1:1. A ratio of the balls to red mud to be ground was 1:1 and a rotation speed of wet grinding was 600 r/min.

(2) Carbide slag, water and a polycarboxylate series high-efficiency water reducer with a mass ratio of 100:50:4 were added to a wet planetary ball grinder tank for 50 min of wet grinding. By using a 100-mesh square hole sieve, the wet grinding balls were removed to obtain a slurry B, and the solid particles in the slurry B had a particle size of 5.7 μm.

In this step, the wet grinding balls were obtained by mixing zirconia balls of ball diameters of 0.7 mm to 1.0 mm and ball diameters of 1.2 mm to 1.5 mm at a mass ratio of 2:1. A ratio of the balls to red mud to be ground was 3:1 and a rotation speed of wet grinding was 400 r/min.

(3) 70 parts of the slurry A, 30 parts of the slurry B, 100 parts of slag powder and 20 parts of water were taken and mixed to obtain a slurry C, where a pH value of the slurry C was 12.1.

(4) The slurry C was taken, molded and then cured for 7 d and 28 d to obtain test blocks.

The preparation method of the present invention has simple steps, and the obtained test blocks have good volume stability without cracking and powdering. The strength of the obtained test blocks is evaluated based on GB/T 17671-1999 Method of testing cements—Determination of strength (ISO method) to show the compressive strength of 7 d is 26.6 MPa and the compressive strength of 28 d is 44.1 MPa.

Example 3

The specific steps of the present example are described below.

(1) Water, red mud, sodium polycarboxylate, and triethanolamine with a mass ratio of 100:30:2:2 were added to a wet grinding carbon sequestration apparatus to perform wet grinding, and simultaneously $CO_2$ was introduced at a flow rate of 0.25 L/min and a pressure in the wet grinding carbon sequestration apparatus was kept at 0.5 MPa, until a pH of a slurry reached 7.4. By using a 50-mesh square hole sieve, the wet grinding balls were removed to obtain a slurry A, and the solid particles in the slurry A had a particle size of 4.5 μm.

In this step, the wet grinding balls were obtained by mixing zirconia balls of ball diameters of 1.5 mm to 2.0 mm and ball diameters of 2.5 mm to 3.0 mm at a mass ratio of 1:1. A ratio of the balls to red mud to be ground was 1:1 and a rotation speed of wet grinding was 400 r/min.

(2) Carbide slag, water and a phenolsulfonate series high-efficiency water reducer with a mass ratio of 100:60:5 were added to a wet planetary ball grinder tank for 60 min of wet grinding. By using a 100-mesh square hole sieve, the wet grinding balls were removed to obtain a slurry B, and the solid particles in the slurry B had a particle size of 5.2 μm.

In this step, the wet grinding balls were obtained by mixing zirconia balls of ball diameters of 0.7 mm to 1.0 mm and ball diameters of 1.2 mm to 1.5 mm at a mass ratio of 2:1. A ratio of the balls to red mud to be ground was 3:1 and a rotation speed of wet grinding was 600 r/min.

(3) 80 parts of the slurry A, 50 parts of the slurry B, 100 parts of slag powder and 25 parts of water were taken and mixed to obtain a slurry C, where a pH value of the slurry C was 12.6.

(4) The slurry C was taken, molded and then cured for 7 d and 28 d to obtain test blocks.

The preparation method of the present invention has simple steps, and the obtained test blocks have good volume stability without cracking and powdering. The strength of the obtained test blocks is evaluated based on GB/T 17671-1999 Method of testing cements—Determination of strength (ISO method) to show the compressive strength of 7 d is 28.3 MPa and the compressive strength of 28 d is 45.7 MPa.

Example 4

The specific steps of the present example are described below.

(1) Water, red mud, sodium sulfate, and β-cyclodextrin with a mass ratio of 100:50:3:4 were added to a wet grinding carbon sequestration apparatus to perform wet grinding, and simultaneously $CO_2$ was introduced at a flow rate of 0.15 L/min and a pressure in the wet grinding carbon sequestration apparatus was kept at 0.3 MPa, until a slurry pH reached 7.3. By using a square hole sieve, the wet grinding balls were removed to obtain a slurry A, and the solid particles in the slurry A had a particle size of 3.0 μm.

In this step, the wet grinding balls were obtained by mixing zirconia balls of ball diameters of 1.5 mm to 2.0 mm and ball diameters of 2.5 mm to 3.0 mm at a mass ratio of 1:1. A ratio of the balls to red mud to be ground was 1:1 and a rotation speed of wet grinding was 800 r/min.

(2) Carbide slag, water and a water reducer with a mass ratio of 100:40:3 were added to a wet planetary ball grinder tank for 40 min of wet grinding. By using a 100-mesh square hole sieve, the wet grinding balls were removed to obtain a slurry B, and the solid particles in the slurry B had a particle size of 7.9 μm. In this example, the water reducer was obtained by compounding a naphthalene series high-efficiency water reducer and a polycarboxylate series high-efficiency water reducer at a mass ratio of 1:1.

In this step, the wet grinding balls were obtained by mixing zirconia balls of ball diameters of 0.7 mm to 1.0 mm and ball diameters of 1.2 mm to 1.5 mm at a mass ratio of 2:1. A ratio of the balls to red mud to be ground was 3:1 and a rotation speed of wet grinding was 200 r/min.

(3) 60 parts of the slurry A, 40 parts of the slurry B, 100 parts of slag powder and 15 parts of water were taken and mixed to obtain a slurry C, where a pH value of the slurry C was 11.9.

(4) The slurry C was taken, molded and then cured for 7 d and 28 d to obtain test blocks.

The preparation method of the present invention has simple steps, and the obtained test blocks have good volume stability without cracking and powdering. The strength of the obtained test blocks is evaluated based on GB/T 17671-1999 Method of testing cements—Determination of strength (ISO method) to show the compressive strength of 7 d is 25.7 MPa and the compressive strength of 28 d is 42.5 MPa.

Comparative Example 1

The comparative example includes the following steps.
(1) Water, red mud, sodium hexametaphosphate, and β-cyclodextrin with a mass ratio of 100:20:1:3 were added to a wet grinding apparatus to perform slurry refining treatment. After wet grinding, the particle size reached 4.7 μm. By using a 50-mesh square hole sieve, the wet grinding balls were removed to a slurry A.

In this step, the wet grinding balls were obtained by mixing zirconia balls of ball diameters of 1.5 mm to 2.0 mm and ball diameters of 2.5 mm to 3.0 mm at a mass ratio of 1:1. A ratio of the balls to red mud to be ground was 2:1 and a rotation speed of wet grinding was 500 r/min.

(2) Carbide slag, water and a water reducer with a mass ratio of 100:30:2 were added to a wet planetary ball grinder tank for 30 min of wet grinding to achieve slurry refining treatment. After wet grinding, the particle size reached 6.8 μm. By using a 100-mesh square hole sieve, the wet grinding balls were removed to obtain a slurry B. In this comparative example, the water reducer was obtained by compounding a phenolsulfonate series high-efficiency water reducer and a polycarboxylate series high-efficiency water reducer at a mass ratio of 1:1.

In this step, the wet grinding balls were obtained by mixing zirconia balls of ball diameters of 0.7 mm to 1.0 mm and ball diameters of 1.2 mm to 1.5 mm at a mass ratio of 2:1. A ratio of the balls to red mud to be ground was 2:1 and a rotation speed of wet grinding was 300 r/min.

(3) 50 parts of the slurry A, 20 parts of the slurry B, 100 parts of slag powder and 10 parts of water were taken and mixed to obtain a slurry C, where a pH value of the slurry C was 13.0.

(4) The slurry C was taken, molded and then cured for 7 d and 28 d to obtain comparative example test blocks.

Compared with the example 1, the comparative example 1 has differences in that: in step (1), only the red mud is ground without introducing $CO_2$ for carbonization. In this comparative example, the strength of the obtained test blocks is evaluated based on GB/T 17671-1999 Method of testing cements—Determination of strength (ISO method) to show the compressive strength of 7 d is 15.4 MPa and the compressive strength of 28 d is 30.0 MPa. Thus, the strength of the test blocks is decreased compared with the example 1.

Comparative Example 2

The comparative example includes the following steps.
(1) Water, red mud, and triethanolamine with a mass ratio of 100:30:2 were added to a wet grinding carbon sequestration apparatus to perform wet grinding, and simultaneously $CO_2$ was introduced at a flow rate of 0.25 L/min and a pressure in the wet grinding carbon sequestration apparatus was kept at 0.5 MPa, until a slurry pH reached 7.5. The slurry particle size after wet grinding reached 4.8 μm. By using a 50-mesh square hole sieve, the wet grinding balls were removed to obtain a slurry A.

The wet grinding parameters in step (1) were: selecting zirconia balls with ball diameters of 1.5 to 2.0 mm and ball diameters of 2.5 to 3.0 mm and mixing the balls at a ratio of 1:1, a ratio of the balls to red mud to be ground of 1:1 and a rotation speed of 400 r/min.

Carbide slag, water and a water reducer with a mass ratio of 100:60:5 were added to a wet planetary ball grinder tank for 60 min of wet grinding to achieve slurry refining treatment. By using a 100-mesh square hole sieve, the wet grinding balls were removed to obtain a slurry B. The particle size of the solid particles in the slurry B reached 5.2 μm. In this comparative example, the water reducer was obtained by compounding a phenolsulfonate series high-efficiency water reducer and a polycarboxylate series high-efficiency water reducer at a mass ratio of 1:1.

In this step, the wet grinding balls were obtained by mixing zirconia balls of ball diameters of 0.7 mm to 1.0 mm and ball diameters of 1.2 mm to 1.5 mm at a mass ratio of 2:1. A ratio of the balls to red mud to be ground was 3:1 and a rotation speed of wet grinding was 600 r/min.

(3) 80 parts of the slurry A, 50 parts of the slurry B, 100 parts of slag powder and 25 parts of water were taken and mixed to obtain a slurry C, where a pH value of the slurry C was 12.4.

(4) The slurry C was taken, molded and then cured for 7 d and 28 d to obtain comparative example test blocks.

Compared with the example 3, the comparative example 2 has differences in that: in step (1), no crystalline control agent was added when the red mud is wet-ground. In this comparative example, the strength of the obtained test blocks is evaluated based on GB/T 17671-1999 Method of testing cements—Determination of strength (ISO method) to show the compressive strength of 7 d is 17.4 MPa and the compressive strength of 28 d is 32.6 MPa. Thus, the strength of the test blocks is decreased compared with the example 3.

Table 1 test data of test blocks of the examples 1 to 4 and the comparative examples 1 to

| Serial Number | 7 d Compressive strength | 28 d Compressive strength |
| --- | --- | --- |
| Example 1 | 23.8 MPa | 40.3 MPa |
| Example 2 | 26.6 MPa | 44.1 MPa |
| Example 3 | 28.3 MPa | 45.7 MPa |
| Example 4 | 25.7 MPa | 42.5 MPa |
| Comparative example 1 | 15.4 MPa | 30.0 MPa |
| Comparative example 2 | 17.4 MPa | 32.6 MPa |

The data of the compressive strength of the test blocks of the examples 1 to 4 and the comparative examples 1 to 2 are listed in the above Table 1. It can be seen from the Table that in the comparative example 1, no $CO_2$ is introduced and the alkalinity of the red mud is not decreased, and further, the $Na_2CO_3$ component capable of compound activation with the $Ca(OH)_2$ component in the carbide slag is not generated, and thus strength is decreased. In the comparative example 2, no crystalline control agent is added and the effect of adding the crystalline control agent is to convert $CaCO_3$ generated during red mud wet grinding and carbon sequestration into a needle-rod-like calcium carbonate capable of making contribution to the strength. Further the needle-rod-like calcium carbonate is seldom agglomerated and easier to disperse and thus can give better strengthening and toughening function to the system. Therefore, no addition of the crystalline control agent may lead to decrease of the strength.

The above descriptions for the specific examples of the present invention are used for the purpose of illustration and exemplification. These descriptions are not to limit the present invention to the disclosed accurate form, and apparently, based on the above teaching, there may be many changes and modifications. Selection and description for the illustrative examples are to explain the specific principle and actual application of the present invention, such that those skilled in the art can achieve and use different illustrative implementations of the present invention and different selections and changes. The scope of the present invention is intended to be defined by the claims and its equivalents.

What is claimed is:

1. A method of preparing an alkali activation material, comprising:
   (1) performing wet grinding on water, red mud, a crystalline control agent, and a grinding aid with a mass ratio of 100:(20 to 50):(1 to 3):(1 to 5), simultaneously introducing $CO_2$ at a flow rate of 0.1 to 0.25 L/min, and keeping a pressure at 0.2 to 0.5 MPa until a pH of a slurry reaches 7 to 7.5, so as to obtain a slurry A;
   (2) adding carbide slag, water, and a water reducer with a mass ratio of 100:(30 to 60):(1 to 5) into a wet planetary ball grinder tank for 30 to 60 min of wet grinding so as to obtain a slurry B;
   (3) mixing 50 to 80 parts by mass of the slurry A and 20 to 50 parts by mass of the slurry B to obtain the alkali activation material;
   wherein the crystalline control agent is selected from a group consisting of sodium hexametaphosphate, sodium sulfate and sodium polycarboxylate.

2. The method of claim 1, wherein,
the red mud is a red mud produced after alumina is produced by using Bayer process, a pH value of the red mud is 11 to 13 and a medium particle size of the red mud is 5 μm to 10 μm.

3. The method of claim 1, wherein,
the grinding aid is selected from a group consisting of triethanolamine, β-cyclodextrin, and ethylenediamine tetraacetic acid.

4. The method of claim 1, wherein,
the water reducer is selected from a group consisting of a naphthalene series water reducer, a phenolsulfonate series water reducer, and a polycarboxylate series water reducer.

5. The method of claim 1, wherein,
the $CO_2$ introduced in step (1) is a gas captured and purified from an industrial production exhaust gas, with a purity greater than 90%.

6. The method of claim 1, wherein,
wet grinding parameters in step (1) are: selecting zirconia balls with ball diameters of 1.5 to 2.0 mm and with ball diameters of 2.5 to 3.0 mm mixing at a ratio of 1:1; a ratio of the balls to the red mud to be ground of 1:3 to 3:1; and a rotation speed of 400 to 800 r/min.

7. The method of claim 1, wherein,
a pH value of the carbide slag in step (2) is 12 to 13 and a median particle size of the carbide slag is 20 μm to 30 μm.

8. The method of claim 1, wherein,
wet grinding parameters in step (2) are: selecting zirconia balls with ball diameters of 0.7 to 1.0 mm and with ball diameters of 1.2 to 1.5 mm mixing at a mass ratio of 2:1; a ratio of the balls to the red mud to be ground of (1 to 4):1; and a rotation speed of 200 to 600 r/min.

* * * * *